United States Patent Office 3,450,206
Patented June 17, 1969

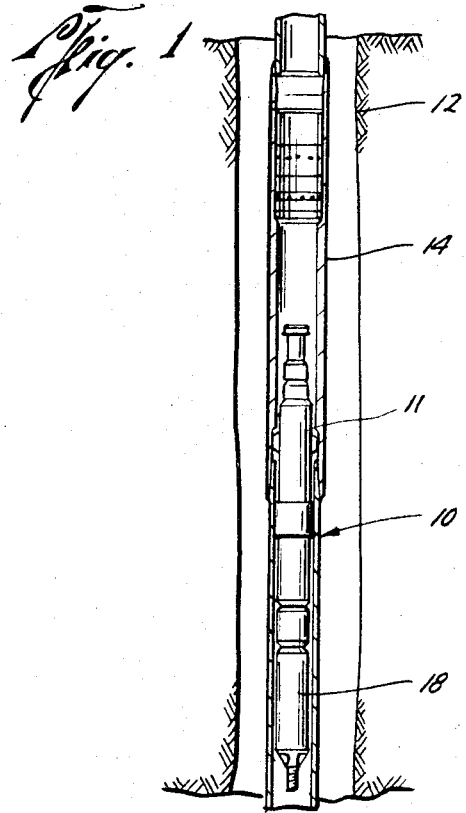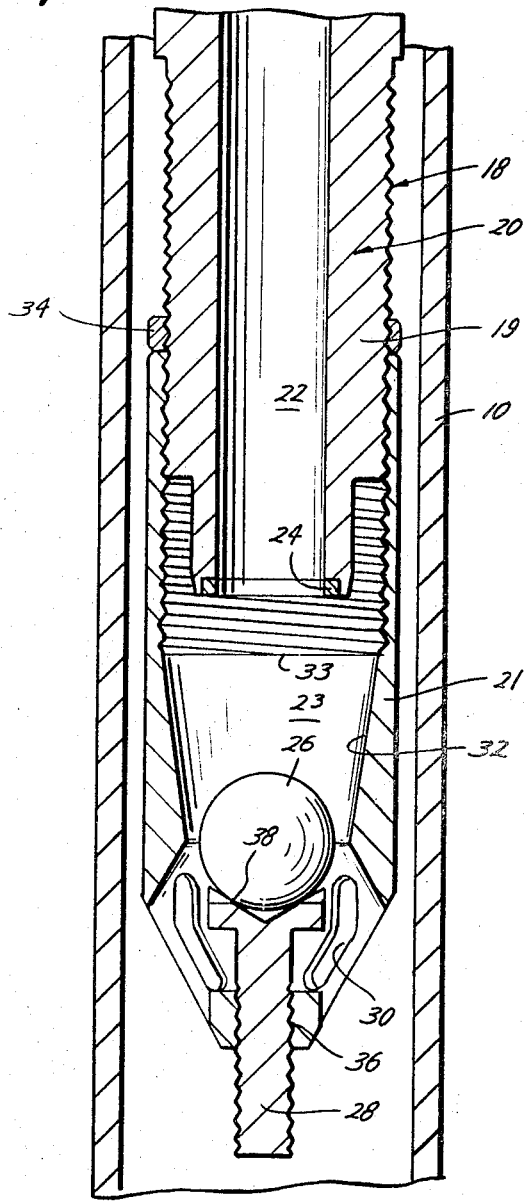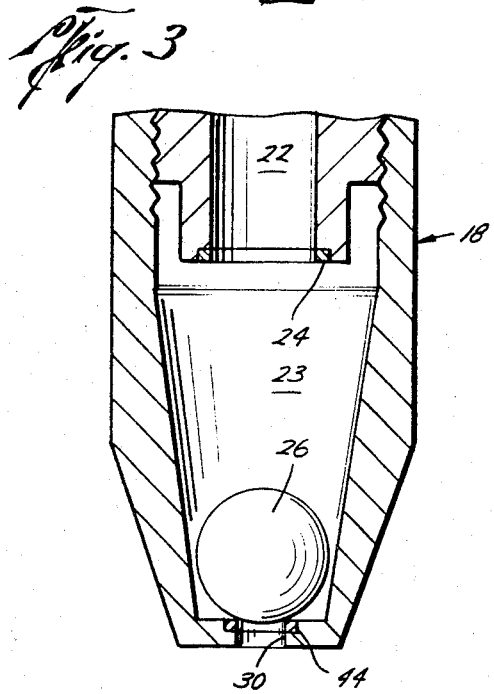
Fred E. Watkins
INVENTOR.
ATTORNEYS

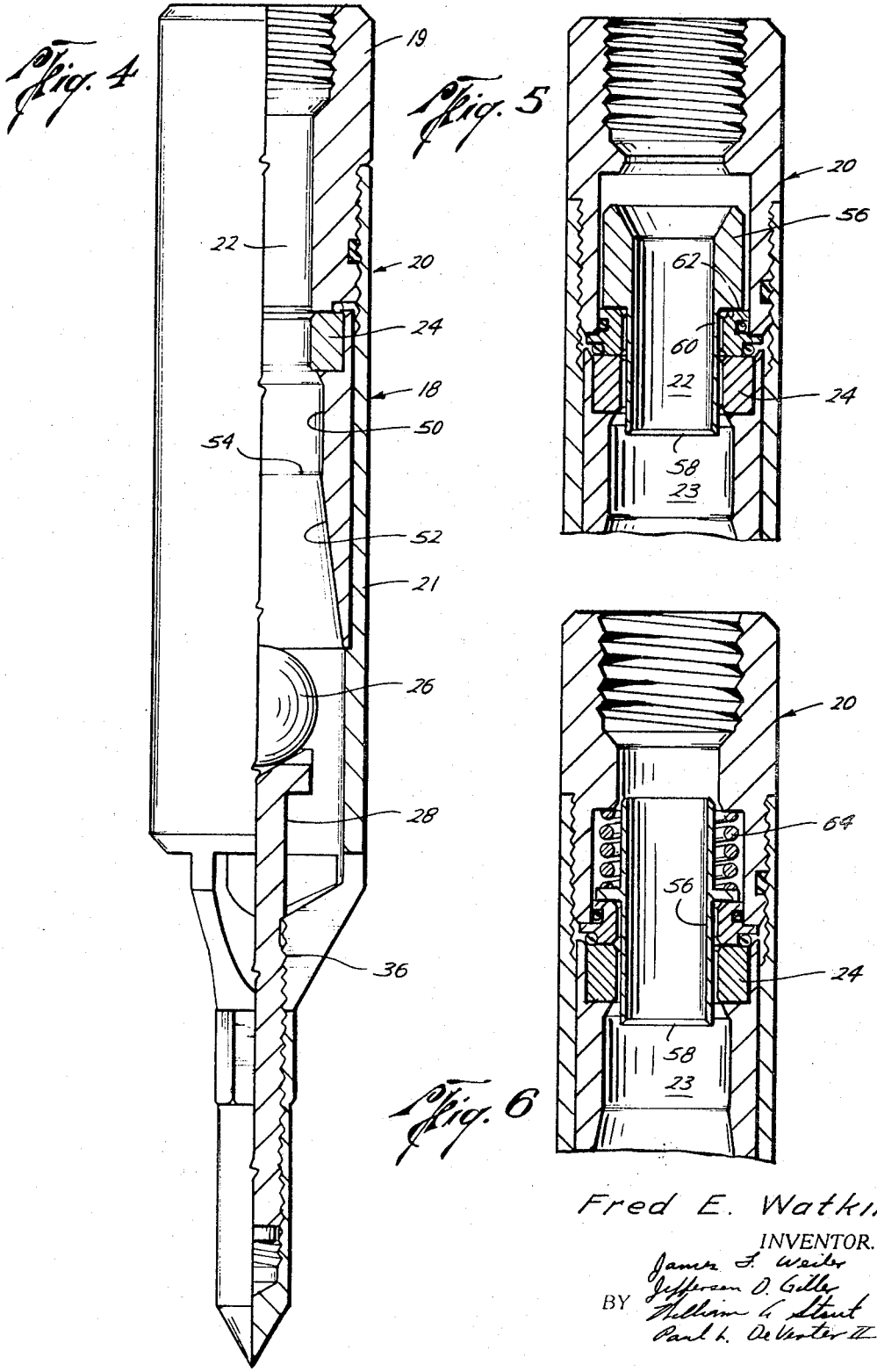

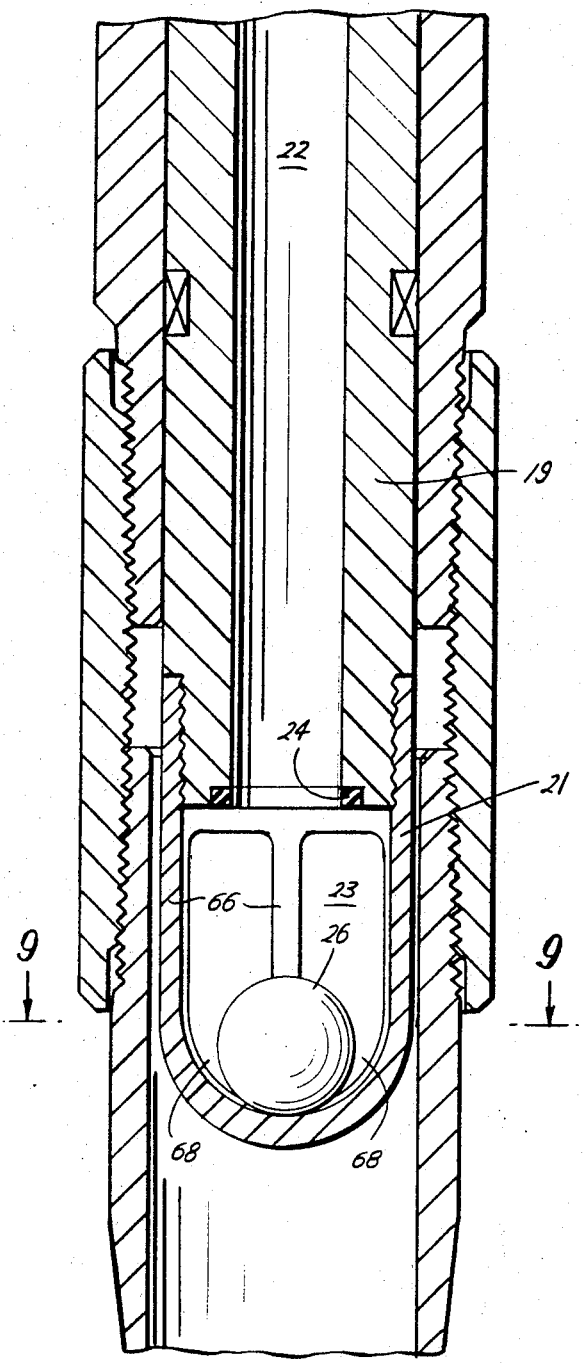
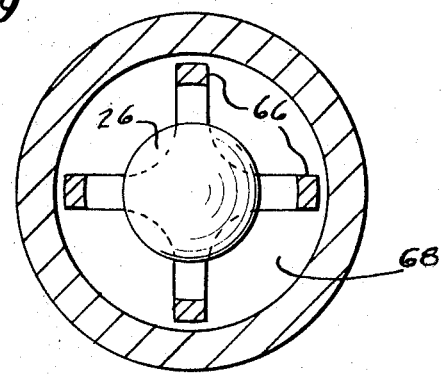
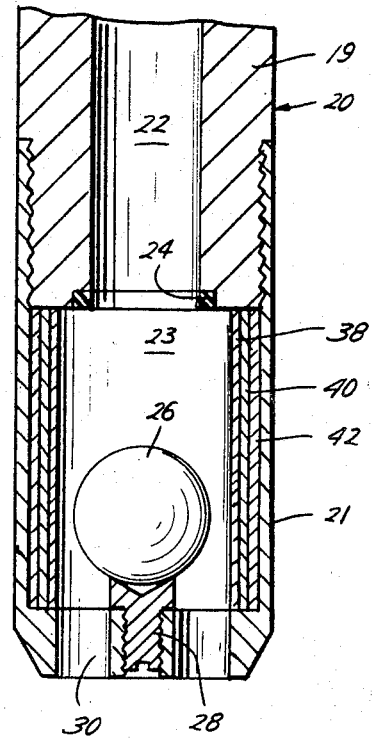
Fred E. Watkins
INVENTOR.
ATTORNEYS

3,450,206
FLOW CONTROL VALVE
Fred E. Watkins, Houston, Tex., assignor to Camco, Incorporated, Houston, Tex., a corporation of Texas
Filed Sept. 28, 1967, Ser. No. 671,271
Int. Cl. E21b 33/12, 15/04
U.S. Cl. 166—224                                      4 Claims

ABSTRACT OF THE DISCLOSURE

A flow control valve limiting the flow of fluid in a production string in a petroleum well having a valve seat positioned in a flow passageway, a float positioned in the passageway below the valve seat in which the cross-sectional area of the passageway below the seat and about the float is sized such that when the flow rate of fluid through the passageway reaches the desired maximum, the fluid flow will raise the float onto the seat closing the valve. A plurality of telescoping tubular sections below the valve seat for varying the size of the passageway for setting the flow rate at which the valve closes. A portion of the passageway below the valve seat being tapered and movable relative to the valve seat for adjusting the flow rate at which the valve closes. A portion of the passageway below the valve seat being tapered inwardly toward the valve seat to provide a fast acting closing of the valve. A tubular member slidably extending downwardly through and protecting the valve seat from abrasive fluid flow. A vertically adjusted support under the ball float for positioning the vertical position of the float. A second valve seat in the passageway below the float providing a check valve.

BACKGROUND OF THE INVENTION

It is common practice in the production of petroleum products such as oil or gas to provide a flow control valve or safety valve located within the production string in the well that will allow the passage upwardly of normally produced rates, but in the event that the flow rate should increase to some undesired predetermined value of the flow control valve will close causing the flow through the production string to be sealed off thereby preventing a blowout. Most of the flow control valves in present use require a substantial pressure drop thereby causing high fluid velocities through the flow control valves. These high velocities are imparted to the produced petroleum which includes sand which in turn causes erosion and eventual malfunction of the flow control valve.

SUMMARY

The present invention is directed to providing a flow control valve for limiting the flow of fluid in a production string in a petroleum well by providing a passageway having a valve seat therein with a float positioned below the valve seat and adapted to coact with the seat to close the passageway when the flow rate therethrough increases to some predetermined value in which the portion of the passageway surrounding the float is sized to allow a desired maximum flow rate through the valve but in which the float is raised up into a sealing relationship with the seat when the flow rate increases above the desired maximum.

A further object of the present invention is the provision of a plurality of telescoping sections below the valve seat and about the float whereby the size of the passageway about the float may be controlled to adjust the closing rate of the valve.

A still further object of the present invention is the provision of a flow limiting control valve in which a portion of the passageway below the valve seat and about the float is tapered outwardly in an upward direction and in which the valve seat is adjustable relative to the tapered portion to adjust the size of the passageway to control the closing flow rate of the valve.

A still further object of the present invention is the provision of a flow limiting control valve in which a portion of the flow passageway below the valve seat is tapered upwardly and inwardly to provide a streamlined flow passage and to provide a snap acting closing action to increase the stability of the float.

Yet a further object of the present invention is the provision of a flow limiting control valve having a vertical adjustable support for positioning the vertical position of the float to prevent the float from bouncing around and becoming damaged during normal flow conditions.

Yet a still further object of the present invention is the provision of a flow limiting control valve in which a tubular member slidably extends downwardly through and protects the valve seat from abrasive flow and protects the valve seat by having a sufficient weight or by being yieldably held in a downward position by a spring during normal flow conditions.

A still further object of the present invention is the provision of a flow limiting control valve having a valve seat and a float positioned thereunder to close when the flow rate reaches a predetermined maximum in which a second valve seat is positioned below the float to provide a check valve as well as a flow control function.

A further object of the present invention is the provision of a flow limiting control valve which has a minimum number of moving parts which are subjected to the deposition and abrasive action of sand, scale and other solids which might interfere with the valve operation and in which the valve has a large passageway opening with streamlined flow passage to reduce pressure drop, high velocities and turbulence that lead to eventual erosion and malfunction.

BRIEF DESCRIPTION OF THE DRAWINGS

In the attached drawings, like character references refer to like parts throughout the several views in which, FIGURE 1 illustrates a production string in a petroleum well in which the control valve of the present invention is located, FIGURE 2 is a fragmentary elevational view, in cross-section, of a flow control valve of the present invention, FIGURE 3 is a fragmentary elevational view, in cross-section of a flow control valve which includes a second valve seat so to additionally perform the function of a reverse check valve, FIGURE 4 is an elevational view, in cross-section of another embodiment of the flow control valve of the present invention which provides a snap acting closing action, FIGURE 5 is a fragmentary elevational view of a portion of a flow control valve illustrating the provision of a tubular member slidably extending through a valve seat to limit abrasion of the valve seat, FIGURE 6 is a fragmentary elevational view in cross-section similar to FIGURE 5 showing the addition of a spring if necessary, to maintain the tubular member in a downward position during normal flow rate, FIGURE 7 is a fragmentary elevational view, in cross-section of the lower portion of a flow control valve having a plurality of telescoping members for suitably adjusting the size of the passageway for controlling the rate of flow at which the valve closes, FIGURE 8 is a fragmentary elevational view, in cross-section of the lower portion of a flow control valve in which the lower portion of the passageway inlet is directed outwardly about the float as well as downwardly to increase the cross-sectional area of the passageway to allow the valve to control larger rates of flow, and FIGURE 9 is a cross-sectional view taken along line 9—9 of FIGURE 8.

Referring to the drawings, and particularly to FIGURE 1, a conventional production string 10 is shown in a well bore producing petroleum products such as oil and gas from a well bore 12. As previously noted, it is conventional to locate within the production string 10 a flow limit control valve or safety valve 18 set in the tubing string 10 by conventional wire line setting tools to limit the flow rate of fluid through the production string 10, which valve will close if the rate increases to some predetermined value. For example, the safety valve 18 may be connected to a Camco M lock 11 which is conventionally set in a Camco Magnaset nipple 14 and no further description is believed necessary.

Referring now to FIGURE 2, the flow limiting control valve generally indicated by the numeral 18 generally includes a housing 20 including upper portion 19 and lower portion 21 having a passageway 22 therein, a valve seat 24 in the passageway, and a float 26 in the passageway positioned below the valve seat 24. The passageway 22 includes a lower portion 23 positioned below the valve seat 24. The lower end of the housing 20 includes support means 28 to retain the float 26 in the lower portion 23 of the housing passageway 22. The lower end of the passageway 22 communicates with inlets 30 from the interior of the lower end of the production string 10. Thus, a production fluid flows upwardly in the production string 10, the flow passes through the inlets 30 into the passageway 22 and upwardly into the upper portion of the production string 10. Thus a pressure drop is created across the float 26 since the only force preventing the float 26 from rising with the flow of fluid therethrough is the weight of the float. The float 26 will rise in the portion 23 of the passageway 22 when the flow acting in the annulus between the float 26 and the walls of the passageway portion 23 produces a pressure drop which acts on the float 26 sufficient to offset the float's weight. By making the float 26 a ball or other configuration that contains a surface for coacting and sealing with the valve seat 24 so that the float 26 will rise and seal against the seat 24 at a desired maximum rate of flow, a flow limiting control valve is provided that is rate sensitive. Since the float 26 will become unstable and move upwardly onto the seat 24 when a particular pressure drop is generated across the float, and since the rate of flow is governed by this pressure drop and the annulus between the float 26 and the walls of the surrounding passageway portion 23, it is noted that the maximum rate of flow at which the valve closes can be controlled by adjusting the size of the annular area between the float 26 and the walls of the passageway portion 23 since the force required to raise the float against the seat 24 is essentially constant for all conditions of flow.

Thus controlling the annulus or annular area between the float 26 and the walls of the passageway 23 determines the flow rate at which the float 26 contacts and seals on the seat 24. One way of controlling the size of the cross-sectional area of the passageway 23 is by making the wall 32 of the passageway 23 conical and tapering outwardly in an upward direction as best seen in FIGURE 2. Thus, the annulus between the float 26 and the wall 32 varies depending upon the vertical position of the float 26. As shown in FIGURE 2, with the valve seat 24 positioned in its extreme vertically retracted position, the valve will close only upon the maximum flow rate as determined by the area at the largest diameter 33 of the conical section. It is to be noted that the lower portion of the housing 21 is threadably connected to the upper portion of the housing 19 whereby the seat 24 can be positioned relative to the tapered portion 23 of the passageway, thus controlling the maximum annular area between the float 26 and the wall 32 and consequently controlling the flow rate at which the float 26 contacts and seats against the valve seat 24. Lock nut 34 locks the housing sections 19 and 21 together after the position of the seat 24 is suitably adjusted relative to the passageway portion 23.

The float 26 in the position shown in FIGURE 2 may be moving or may be suspended by the fluid movement flowing through the passageway 22 during normal conditions of flow. It is desirable to keep the float 26 stationary to prevent the float 26 and the wall 32 from becoming damaged due to this movement. Therefore, the support means 28 may include a pedestal having a threaded connection 36 to the lower end of the housing 20 and having a seat 38 thereby allowing the float 26 to be vertically positioned above the height that it would normally be for normal flow rate production conditions, but just below the height at the desired closing rate so that the ball 26 will remain by its own weight stationary on the support seat 38.

As previously mentioned, controlling the annular area between the float 26 and the wall 32 of passageway portion 23 controls the flow rate at which the float contacts and seals against the valve seat 24. As best seen in FIGURE 7, another structure for controlling the cross-sectional area of the passageway beneath the seat 24 is by providing a plurality of telescoping sections such as tubular sections 38, 40 and 42. Thus by unthreading lower housing section 21 from upper housing section 19 one or more of the tubular sections 38, 40 and 42 may either be added or removed to reduce or increase the cross-sectional area of the passageway portion 23. Of course, the telescoping sections 38, 40 and 42 may be omitted entirely and the tubular passageway 23 suitably sized for controlling the desired flow rate.

If desired, the flow limiting control valve 18, as best seen from FIGURE 3, may also be utilized as a reverse check valve by providing a second valve seat 44 about the inlet 30 so that upon reverse flow through the valve 18, the float 26 will seat on the second valve seat 44 and prevent flow downwardly through the valve 18.

Another embodiment of the flow limiting control valve 18 of the present invention is best seen in FIGURE 4 in which the configuration of the walls of the passageway portion 23 below the valve seat 24 differs from that in FIGURE 2 by having a first wall portion 50 immediately below the valve seat 24 of a tubular shape, and a second portion 52 below the first portion having a conical shape tapered upwardly and inwardly. Again, the annulus between the float 26 and the walls of the passageway portion 23 is adjusted to control the flow rate at which the float 26 seats on the valve seat 24 by adjusting the height of the pedestal 28 by the threaded connection 36. However, contrary to the structure shown in FIGURE 2, raising the vertical position of the float 26 acts to lower the flow rate at which the ball 26 will close the passageway 22. By means of the inverted tapered section 52 it is noted that as the present closing flow rate is reached, the float 26 reduces the annular area between the float 26 and the walls 52 of the passageway portion 23 for the same flow rate and an increased pressure drop will be created. This increase in pressure drop will cause the float 26 to be accelerated in an upward direction towards the seat 24 providing a snap acting action in closing the valve. Another feature of the structure shown in FIGURE 4 is that the inverted tapered conical section 52 streamlines the flow passage in the direction of flow as compared with the flow passage shown in FIGURE 2. While, of course, the tubular first portion section 50 may be omitted, it has the advantage of spacing the upper end 54 of the tapered conical section 52 from the valve seat 24 to direct the flow of incoming fluids into the passageway 22 and away from the valve seat 24 to decrease abrasion of the seat 24.

If it is desirable to further protect the valve seat 24 from the cutting action of solid particles in the fluid flow from the producing formation 12, and referring to FIGURE 5, a tubular shield member 56 may be provided in either the structure of FIGURE 2 or FIGURE 4 which slidably extends through the valve seat 24 so that its lower end 58 extends below the valve seat 24 when the shield 56 is in the lowermost position. The weight of the tubular member 56 may be provided such that the shield 56 offsets any forces tending to move it upwardly by the flowing fluids under normal flow conditions and remains in its lowermost position causing the impingement of flow and solid particles to be absorbed by the lower end 58 of the shield 56. The shield 56 is prevented from passing downwardly through the valve seat 24 as a stop shoulder 60 thereon contacts a coating shoulder 62 on the body 20. However, as the float 26 rises up in the passageway 23 and makes contact with the lower end 58 of the shield 56, the shield 56 is moved upwardly by the closing force allowing the float 26 to make contact and seal against the valve seat 24.

FIGURE 6 is similar to FIGURE 5 and illustrates the use of a spring 64 between the body 20 and the tubular shield member 56 to assist in maintaining the shield 56 in a downward position for higher flow rates than the weighted structure of FIGURE 5 in order to protect the valve seat 24. Thus the spring 64 yieldably holds the tubular member 56 in a downward position but again as the float 26 is pushed upwardly on a predetermined maximum flow rate it contacts the lower end 58 of the shield 56 and moves it upwardly against the spring 64 and allows the float to seat on the valve seat 24.

As has been previously mentioned, the size of the flow area about the float controls the flow rate being measured. Therefore, in order to measure larger flow rates without the flow control valve 18 closing, the annulus about the float 26 must be increased. Therefore, and referring to FIGURES 8 and 9, the inlet 68 to the passageway portion 23 below the valve seat 24 enters in a horizontal as well as a vertical direction about the float 26 by supporting the float 26 in a cage like structure having supporting ribs 66 to provide increased size inlets 68 thereby increasing the cross-sectional flow area about the float 26. Thus by providing an increased annular area the flow control valve may measure increased rates of flow.

The present invention, therefore, is well adapted to carry out the objects and attain the ends and advantages mentioned as well as others inherent therein. While presently preferred embodiments are given for the purpose of disclosure, numerous changes in the details of construction and arrangements of parts may be made which will readily suggest themselves to those skilled in the art and which are encompassed within the spirit of the invention and the scope of the appended claims.

What is claimed is:

1. A flow control valve for limiting the flow of fluid in a production string in an oil or gas well comprising:
 a housing adapted to be sealably positioned in said production string and having a passageway therethrough for the flow of well fluid,
 a valve seat in said passageway,
 a float adapted to seat on the valve seat and close said passageway and positioned in said passageway below said valve seat,
 support means connected to the lower end of the housing for retaining the float in said housing passageway including a vertical adjustable support for positioning the vertical position of the float,
 the cross-sectional area of the passageway below the seat and about the ball being sized such that when the flow rate of fluid through the passageway reaches the desired maximum the fluid flow will raise the float onto the seat closing the passageway.

2. A flow control valve for limiting the flow of fluid in a production string in an oil or gas well comprising:
 a housing adapted to be sealably positioned in said production string and having a passageway therethrough for the flow of well fluid,
 a valve seat in said passageway,
 a float adapted to seat on the valve seat and close said passageway and positioned in said passageway below said valve seat,
 the first portion of the passageway immediately below the valve seat is circular in cross-section, and the portion of the passageway below said first portion is conically shaped with the inward taper being directed upwardly to provide a snap acting closure of said valve,
 support means connected to the lower end of the housing for retaining the float in said housing passageway,
 the cross-sectional area of the passageway below the seat and about the ball being sized such that when the flow rate of fluid through the passageway reaches the desired maximum the fluid flow will raise the float onto the seat closing the passageway.

3. The apparatus of claim 2 including a vertical adjustable support for positioning the vertical position of the float relative to the conical shaped portion of said passageway for adjustably selecting the flow rate at which the valve closes.

4. A flow control valve for limiting the flow of fluid in a production string in an oil or gas well comprising:
 a housing adapted to be sealably positioned in said production string and having a passageway therethrough for the flow of well fluid,
 a valve seat in said passageway, a portion of the passageway below the valve seat being conically shaped with the inward taper being directed upwardly,
 a float adapted to seat on the valve seat and close said passageway and positioned in said passageway below said valve seat,
 support means connected to the lower end of the housing for retaining the float in said housing passageway and including a vertical adjustable support for positioning the vertical position of the float relative to the conical portion of the passageway for adjustably selecting the flow rate at which the valve closes.

References Cited
UNITED STATES PATENTS

| 1,882,314 | 10/1932 | Burt | 166—225 |
| 2,122,080 | 6/1938 | Wisdom. | |
| 2,328,014 | 8/1943 | Heigis | 137—519.5 X |
| 3,279,545 | 10/1966 | Page | 166—224 |
| 3,367,362 | 2/1968 | Hoffman | 137—519.5 X |
| 3,385,372 | 5/1968 | Knox | 166—225 |

DAVID H. BROWN, *Primary Examiner.*

U.S. Cl. X.R.

137—519.5